(12) United States Patent
Morris et al.

(10) Patent No.: US 7,069,333 B1
(45) Date of Patent: Jun. 27, 2006

(54) METHOD AND SYSTEMS FOR WIRELESS COMMUNICATION FOR A FIELD SERVICE SYSTEM

(75) Inventors: Roy Morris, Santa Ana, CA (US); Albert Lin, Rancho Palos Verdes, CA (US); Brett Knox, San Clemente, CA (US)

(73) Assignee: FieldCentrix, Inc., Irvine, CA (US)

( * ) Notice: Subject to any disclaimer, the term of this patent is extended or adjusted under 35 U.S.C. 154(b) by 848 days.

(21) Appl. No.: 09/638,447

(22) Filed: Aug. 14, 2000

Related U.S. Application Data

(60) Provisional application No. 60/153,321, filed on Sep. 10, 1999, and provisional application No. 60/148,768, filed on Aug. 13, 1999.

(51) Int. Cl.
*G06F 15/16* (2006.01)

(52) U.S. Cl. ................ 709/232; 709/217; 709/223; 709/224; 709/225; 709/235; 709/236; 709/234; 710/52

(58) Field of Classification Search ................ 709/234, 709/235, 236, 217, 101, 223, 224, 225; 710/52
See application file for complete search history.

(56) References Cited

U.S. PATENT DOCUMENTS

| | | | |
|---|---|---|---|
| 5,313,051 A | 5/1994 | Brogida et al. | |
| 5,508,977 A | 4/1996 | Tymn | |
| 5,615,121 A | 3/1997 | Babayev et al. | |
| 5,963,911 A | 10/1999 | Walker et al. | |
| 6,263,322 B1 | 7/2001 | Kirkevold et al. | |
| 6,529,932 B1 * | 3/2003 | Dadiomov et al. | ......... 709/101 |
| 2002/0087383 A1 | 7/2002 | Cogger et al. | |
| 2003/0069797 A1 | 4/2003 | Harrison | |

OTHER PUBLICATIONS

U.S. Appl. No. 09/638,451, filed Aug. 14, 2000.
Office Action in U.S. Appl. No. 09/638,451 mailed Jan. 22, 2004.

* cited by examiner

*Primary Examiner*—Glenton B. Burgess
*Assistant Examiner*—Kevin Parton
(74) *Attorney, Agent, or Firm*—Knobbe Martens Olson & Bear LLP

(57) ABSTRACT

A mobile field system comprises a service center that is connected to the office of a field service organization and number of customers of the field service organization via the Internet or another computer network. The service center is also connected to the mobile systems of technicians who work for the field service organization by a mobile communications system such as a wireless Internet service provider. One or more message queues may be used to increase the reliability of communications between the systems. By using such a queue, messages may not be lost and the communications can be made transparent to the user of the remote system.

13 Claims, 15 Drawing Sheets

Fig. 2

| | Home | Techs & Calls | | Job Sites | | Employees | Customers | Admin | Alerts ▼ | |
|---|---|---|---|---|---|---|---|---|---|---|

Work Order 42

Details
Labor
Parts
Work Done
Repairs Found
Status
Equipment
Billing Info
PM

| | | | | | | |
|---|---|---|---|---|---|---|
| 41 | Terry Buckley | Complete | Available | 04/07/2000 11:15 AM | 04/07/2000 11:15 AM | Tech - Terry Buckley |
| 41 | Terry Buckley | Signature | Signature | 04/07/2000 11:14 AM | 04/07/2000 11:14 AM | Tech - Terry Buckley |
| 41 | Terry Buckley | In progress | At job site | 04/07/2000 10:15 AM | 04/07/2000 10:15 AM | Tech - Terry Buckley |
| 41 | Terry Buckley | In progress | In route | 04/07/2000 10:00 AM | 04/07/2000 10:02 AM | Tech - Terry Buckley |
| 41 | Terry Buckley | Acknowledged | | 04/07/2000 10:00 AM | 04/07/2000 10:00 AM | Tech - Terry Buckley |
| 41 | Terry Buckley | Received | | 04/06/2000 06:31 AM | 04/06/2000 06:31 AM | Tech - Terry Buckley |
| 41 | Terry Buckley | Sent | | 04/05/2000 04:39 PM | 04/05/2000 04:39 PM | Tech - Terry Buckley |
| 41 | Terry Buckley | Dispatched | | 04/05/2000 04:39 PM | 04/05/2000 04:39 PM | Dispatch - Bob Nabers |
| | | Open | | 04/05/2000 03:51 PM | 04/05/2000 03:51 PM | Dispatch - Bob Nabers |

| | | Service Type | | | | |
|---|---|---|---|---|---|---|
| Lacey Moroneso | | Complete | | 04/07/2000 11:19 AM | 41 | Terry Buckley |

Fig. 3

| Tech # | Tech Name | Status | 7am | 8am | 9am | 10am | 11am | 12pm | 1pm | 2pm | 3pm | 4pm | 5pm | 6pm | 7pm | Worked | Sched. |
|---|---|---|---|---|---|---|---|---|---|---|---|---|---|---|---|---|---|
| 24 | Ames Quintana | Available | | | | | | | | | | | | | | 4.0 | |
| 46 | Anthony Barker | Available | | | | | | | | | 35 | | | | | 17.0 | |
| 34 | Arthur Dixon | Available | | | | | | | | | | | | | | 0.0 | |
| 21 | Brian Shofner | At job site | | | | | | | | | | | | | | 5.0 | |
| 29 | Charles Partridge | Available | | | | | | | | | | | | | | 0.0 | |
| 54 | Chuck Marino | Available | | | | | | | | | | | | | | 0.0 | |
| 45 | David Bender | Available | | | | | | | | | | | | | | 0.0 | |
| 44 | Dennis Batta | Available | | | | | | | | | | | | | | 0.0 | |
| 14 | Eldon Eagle | Available | | | | | | | | | | | | | | 4.5 | |

Records [1-30] [31-43]

Fig. 7a

Readings taken on New  735  737

Cond unit | Elec. • General | Notes

| | Initial | Final |
|---|---|---|
| Charge | Full/Sho | Full/Sho |
| Crankcase htr | | |
| Defrost time (min) | | 250 |
| Heater (amps) | | |
| High side (psi) | 120 | |
| Low heat lock (deg) | | |
| Low side (psi) | 120 | 65 |
| Sub cooling (deg F) | | |
| Superheat (deg F) | | |

Fig. 7b

Help | Diagnostics on New

Comp | Cool coil | Elec | Fans | *General-1 | General-2 | Motors | Notes |

Cancel     OK     — 748

☐ Bad bearings          ☑ Belt off
☐ Bad belt              ☐ Check valve frost
☐ Bad reversing valve   ☐ Coil frost
☐ Belt broken           ☐ Drain lines plugged up
☐ Belt loose            ☐ Low on charge

745

Start | Main Menu | FxAlert | FxWorklist | My Handheld... 2:43 PM

Fig. 8a

| WO # | Cost Code | Job Site | Date | Reg | OT | PT | Reg | OT |
|---|---|---|---|---|---|---|---|---|
| 1001406002 | 001 | Porter, Inc. | 06/1... | 6:00 | 0:00 | 0:00 | 6:00 | 0:00 |
| 1001406006 | 001 | Porter, Inc. | 06/1... | 2:00 | 0:00 | 0:00 | 2:00 | 0:00 |
| 1001406006 | 001 | ABC Industrial | 06/1... | 1:26 | 0:00 | 0:00 | 1:26 | 0:00 |
| 1001406003 | 001 | ABC Industrial | 06/1... | 2:01 | 0:00 | 0:00 | 2:01 | 0:00 |
| Totals | | | | 4... | | | 40:00 | 0:00 |

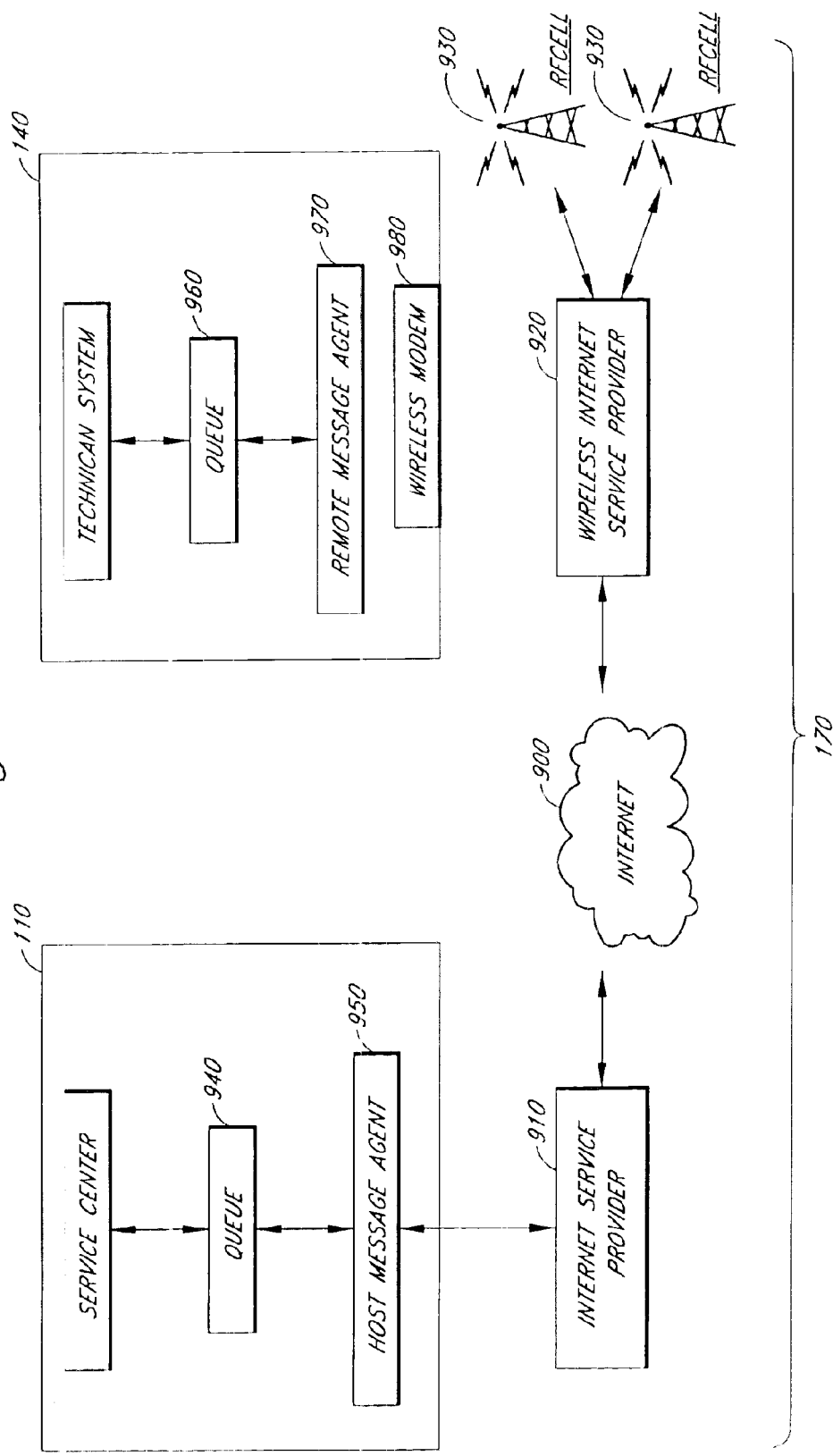

METHOD AND SYSTEMS FOR WIRELESS COMMUNICATION FOR A FIELD SERVICE SYSTEM

RELATED CASES

This application claims priority under 35 U.S.C. § 119(e) from Provisional Application No. 60/148,768, filed 13 Aug., 1999 and Provisional Application No. 60/153,321, filed 10 Sep. 1999, both incorporated herein by reference in their entirety.

BACKGROUND OF THE INVENTION

1. Field of the Invention

The present invention is related to field service, and in particular, the present invention is related to providing wireless communications for data flow to and from field service professionals.

2. Description of the Related Art

In the field service industry, a technician may spend a significant portion of his time involved in administrative or clerical tasks. Some of these activities take place away from the job site, such as receiving jobs from a dispatcher, calling in to a central office to verify the status and location of a job, and preparing and sending in time records. Other of these administrative activities may take place while at the job site, such as checking the availability or cost of parts or verifying prior history of the equipment at a job site.

Necessary as they are, these activities reduce the efficiency of the technician in his primary purpose: to field service the equipment at the job site. Many of these tasks are made slightly more efficient through the use of cellular phones, wireless pagers, or other wireless communications services. However, traditionally, it is still necessary for a technician to actively initiate much of the communication required for these tasks, and in many cases to contact a human operator of one sort or another at his office. This results in further lost time as the technician goes through this process, as well as incurring additional cost to the office operator to provide staff sufficient to respond effectively to the information which may be needed by various technicians in the field.

A further difficulty with wireless communication systems that may be used by field service technicians is that they often require continuous contact between the office and technician in order to provide effective benefits to the technician. The connections between such wireless systems are often intermittent, complicating the communications and reducing the efficiency of the technician.

Using conventional field service wireless communication systems, if a technician using a wireless, mobile software solution is out of coverage, the software will not operate unless connected through the network. Once back in coverage, the technician must take overt action to transmit data, such as spending time downloading needed information in a batch rather than simply downloading new information. In another situation, if it is possible to queue information, the application stops processing while it waits for the technician to return to coverage. This means that while other technicians working in the field are in coverage they are not able to communicate with the home office as the application is waiting for a response from the technician who is out of coverage.

Currently, technicians are working with handheld PC's on rooftops, in elevator shafts, and other rugged environments and few technicians are proficient in their typing skills, making it difficult to use an application whose primary input method is the keyboard.

As a result, there is a need for continued improvement to wireless field service systems for mobile field service personnel to use when receiving, performing, and tracking service work from the office.

SUMMARY OF THE INVENTION

The present invention advantageously provides an efficient, reliable method for managing field service personnel and operations. As will be described below, remote technician systems are wirelessly networked to service centers, customers, and parts warehouses, allowing information to be sent between them parties automatically. This allows a more effectively deployment of technicians and more accurate performance and management of service operations. These and other benefits to both the field service customers and field service organizations will be described in greater detail below.

The present invention provides a system for managing field service information for an office, customer, and technician using a service center system including a database of information about the field service to be performed and the technicians available to perform it. Requests are taken from the customer by the service center system, and these requests are used to prepare work orders, which are then assigned to an available technician. The technician receives the work order and an alert that the work order has been assigned to him. At this point, the technician may perform the work order and use a remote system in order to provide information back to the service center. This information is provided automatically without any explicit activity by the technician other than following the interface of the remote system. The information is provided back to the service center where it may be used to calculate the billing appropriate to the job being performed, or to keep the customer informed of the status of the technician's work.

In a further mode of the present invention, the work order is presented to the technician along with a template of work to be performed such that the technician may only proceed through the interface of the remote system when he indicates that the appropriate steps have been completed. In this way, the work order defines a sequence of tasks for the technician and enforces the desired work flow of the field service organization upon the technician.

Another aspect of the present invention involves using a touch sensitive display upon the remote system of the technician configured to provide areas convenient to activation by the thumbs of the technician as he holds the system. By providing active areas of the screen near the vertical edges of the touch sensitive display, the technician is able to conveniently use virtual buttons placed in these regions without the need to use the keyboard or other input device of the remote system.

In another mode of the present invention, work orders are assigned to technicians by a dispatching process. Multiple field service organizations and customers may operate through a single service center system which manages their dispatching functions. The selection of technician may be handled by either the field service organization or the service center system. However, the work order is sent to the technician from the service center system.

A further aspect of the present invention is a method for providing automated message queuing between a service center system and a remote system. By including a message queue and a message agent in each system communicating through a potentially unreliable channel, it is possible to provide communications which may be restarted automatically when interrupted. When used with wireless communications means, this allows for robust messaging between the service center system and the remote system even when actual communications may be intermittent. Advantageously, the remote system is capable of operating independently during times while communications are not available.

Methods of communicating across such a queue-based wireless system are also provided in a further aspect of the present invention. By automatically forwarding messages when available and queuing messages, work may be assigned without concern that work orders or other information will be lost in transmission.

In a further mode of the present invention, the technician also has the capability of automatically requesting parts or other equipment needed to perform the service at the job site directly from his remote system. This information is sent to a parts repository which responds to the technician with the cost and availability of the parts requested. In further modes of operation, the parts may then be automatically delivered to the job site for use by the technician in effecting the desired repairs.

BRIEF DESCRIPTION OF THE DRAWINGS

The above mentioned and other features of the invention will now be described with reference to the drawings of a preferred embodiment of the present field service system. The described embodiment of the anchoring system is intended to illustrate, but not to limit the invention. The drawings contain the following figures:

FIG. 3 shows a typical user interface screen for the office system showing the status of technicians using the field service system;

FIG. 7A shows a typical user interface screen for the technician system allowing the technician to record any readings taken at the job site for a particular piece of equipment;

FIG. 7B shows a typical user interface screen for the technician system showing various diagnostic actions to be performed while working on the equipment at the job site;

FIG. 8A shows a typical user interface screen for the technician system showing the current time log of the technician for review;

FIG. 9 illustrates the architecture for a wireless communication system for use between a service center system and a technician system in accordance with one embodiment of the present invention.

DETAILED DESCRIPTION OF PREFERRED EMBODIMENTS

The following description and examples illustrate preferred embodiments of the present invention in detail. Those of skill in the art will recognize that there are numerous variations and modifications of this invention that are encompassed within its scope. Accordingly, the description of preferred embodiments should not be deemed to limit the scope of the present invention. Reference numbers are used to indicate items in the included figures. Reference numbers are reused between figures to indicate the same item.

Overview

The present invention advantageously provides an efficient, reliable system for managing field service personnel and operations. As will be described below, by wirelessly networking remote technician terminals to service centers, customers, and parts warehouses, information may be sent between these parties automatically. This allows technicians to be more effectively deployed and service operations to be more accurately performed and managed. In this way, both field service customers, and field service organizations benefit.

Figure 1:
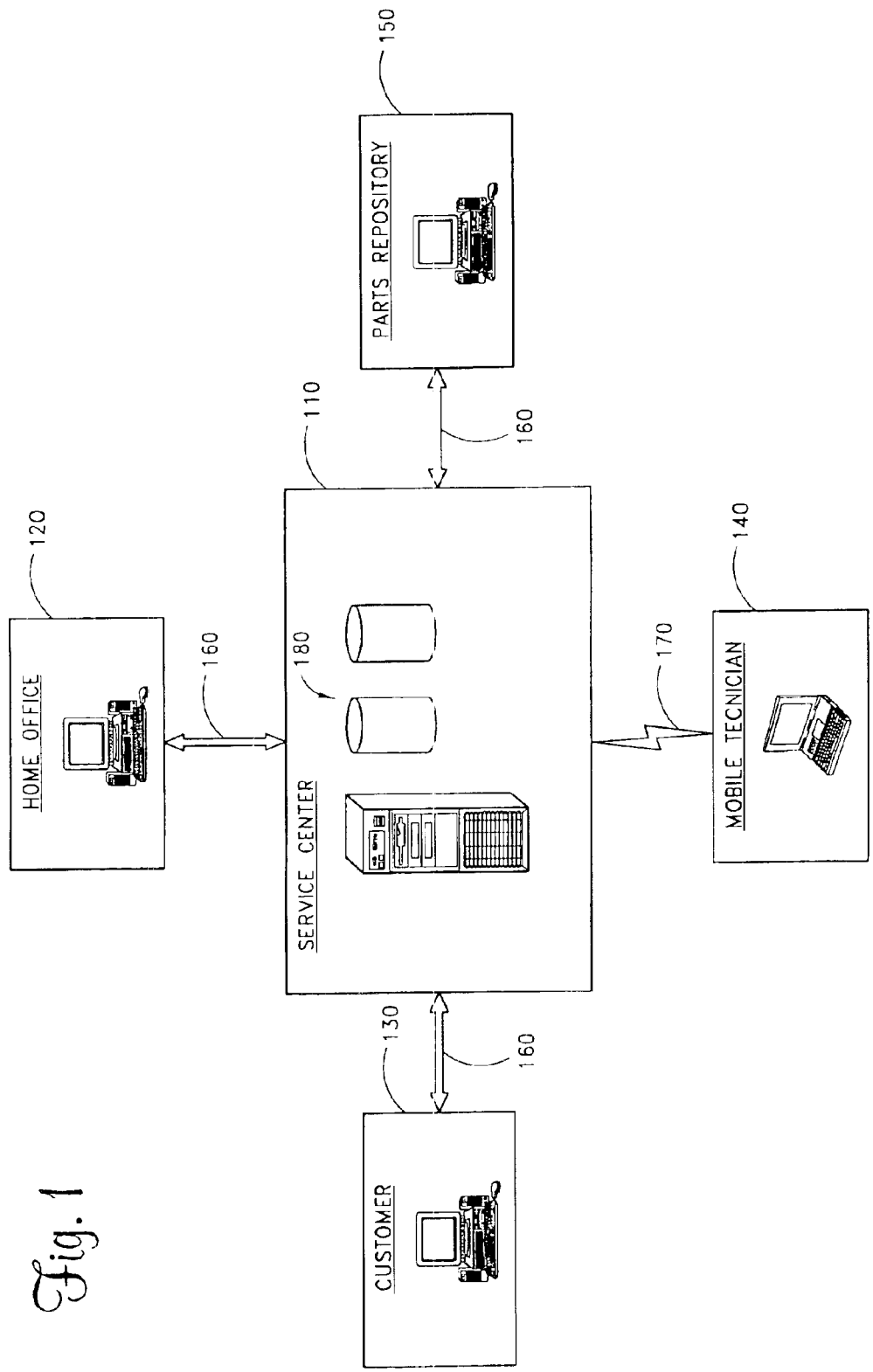
FIG. 1 illustrates the architecture of a field service management system configured in accordance with one embodiment of the present invention.

As illustrated in FIG. 1, one embodiment of the present invention may comprise a distributed system having several components. Viewed broadly, these components comprise equipment which is distributed among multiple users, these users including one or more service centers, one or more home offices, one or more customers, and one or more mobile technicians. Further embodiments may also include equipment used by a parts vendor at a parts repository. The equipment generally comprises computer systems configured to interact with the other computer systems of the present invention. The computer systems for the home office 120, customers 130, parts vendor 150, and technicians 140 are connected to the service center system 110 via various communications media 160, 170 as will be discussed in greater detail below.

As used herein, 'computer' or 'computer system' is used to refer broadly to any data processing system or terminal. The exemplary computers described herein may be small business computers such as a PC or Macintosh computers as well as servers which are in use at a particular site. However, those skilled in the art will recognize that other types of computer system are possible and may be used in different circumstances. These include without limitation: multi-user computer systems, systems based upon platforms other than Macintosh or Intel architectures, enhanced telephones and pagers, personal digital assistants, interactive audio and video kiosks, interactive television systems, handheld computers, personal digital assistants, and such other devices as are known in the art.

In some particular applications, it is significant that a mobile or portable computer system is used. In particular, a computer system in use by a technician is advantageously a mobile computer. The present invention is not limited to embodiments as are described below in which a portable computer is used as the technician's system; however, for certain applications, the use of wireless portable computers offers significant advantages. Those of skill in the art will recognize that a 'portable computer system' may include without limitation: an enhanced cellular phone or paging device, a personal digital assistant, a handheld computer, a laptop computer, a computer embedded in another device such as a clipboard, a wearable computer, a tablet computer, or any other such device as in known in the art.

The functions described herein to be performed by the various computer systems are accomplished through the use of appropriate programming of the computer systems. This programming may include a series of software modules or other files which may be loaded onto the particular computer system on which the software is intended to run. However, those of ordinary skill in the art will recognize that the term 'software' as used herein broadly refers to any sort of programming applied to a computer system, and may include without limitation: user-loaded program modules, memory resident programs, programs loaded onto removable media, programs loaded into firmware or other non-volatile storage media, custom configured operating software, and other such programming techniques as are known in the art.

In all of the embodiments described herein, the various systems pass information to each other across communications media of different types. In one embodiment, the communications media 160 used to communicate between the office, service center system, customers and parts vendor comprise computer networks and the Internet; the communications media 170 between the service center system and the technician is generally a wireless network in one mode of operation, such as CDMA networks, microwave networks, or wireless DSL networks. However, other communications media may be used for various connections between the systems. These can include without limitation: land line telephone connections, analog or digital cellular telephone connections, radio frequency communications, pager networks, television cable networks, and other forms of communication as are known in the art. In addition, the computer systems may optionally be capable of switching from one communication medium to another.

As mentioned above, the primary components of one preferred embodiment of the present invention comprise five types of interconnected computer systems, each configured for use at a different point of the field service operation. These systems correspond to: the office, the customer, the parts repository, the service center and the mobile technician. Each of these systems will be discussed below.

Office (Field Service Organization)

The home office, referred to hereafter as simply the "office," is run by a field service organization (FSO). An FSO is a company that performs some form of on site service to a customer base. This could include businesses such as HVAC or plumbing repair or similar building maintenance companies, remotely dispatched auto service, copier service, computer support, or such other field service industries as are generally known to those in the art. The office represents the FSO's access to the entire field service management system described herein. Although there may be multiple offices from which the functions of the office may be performed, any FSO using an embodiment of the present invention generally has at least one office system in order to get information into and out of the field service system described below, and in particular, into and out of the service center system.

The FSO performs the personnel and administrative functions that are normally part of running a field service business. However, much of the information related to these functions is entered into the field service system of the present invention. For example, the FSO would hire technicians and enter into service contracts with customers just as they normally would. However, information regarding each technician and each contract with a customer would also be entered into the office computer system which is part of the field service system. This information is used to coordinate and automate many processes of the field service system as described below.

The office system 120 may also be used in order to extract information generated or tracked through the field service system from the service center system 110 (described below). This may include such information as the current status of a particular technician, or more general data regarding the current status of technicians. Other information which may be produced includes without limitation: billing information related to particular contracts, time sheets for individual technicians, status information for particular contracts, progress information for particular work orders, and such other information as would be normally used in the art.

Generally speaking, the office system is the main or only direct means in which the FSO needs to interact with the field service management system. This interface is designed to allow the office to update information in the databases of the service center system as necessary. These updates may include information regarding new customers of the FSO and each new customer's identifying information. It is also possible for information on new technicians to be uploaded to the service center system in order to reflect the changes in personnel of the FSO.

Figures 1, 3A:
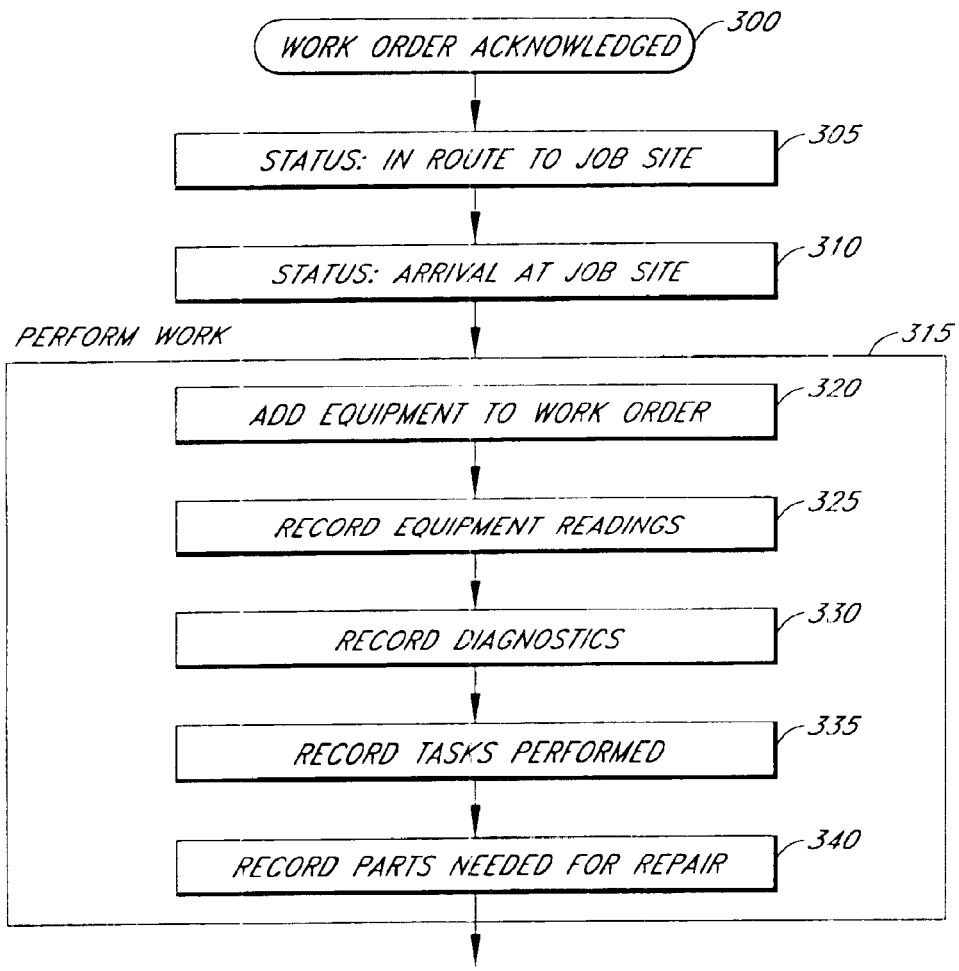
FIG. 3A illustrates a general process for managing the operation of a technician in accordance with one embodiment of the present invention.
Figures 2, 3A:
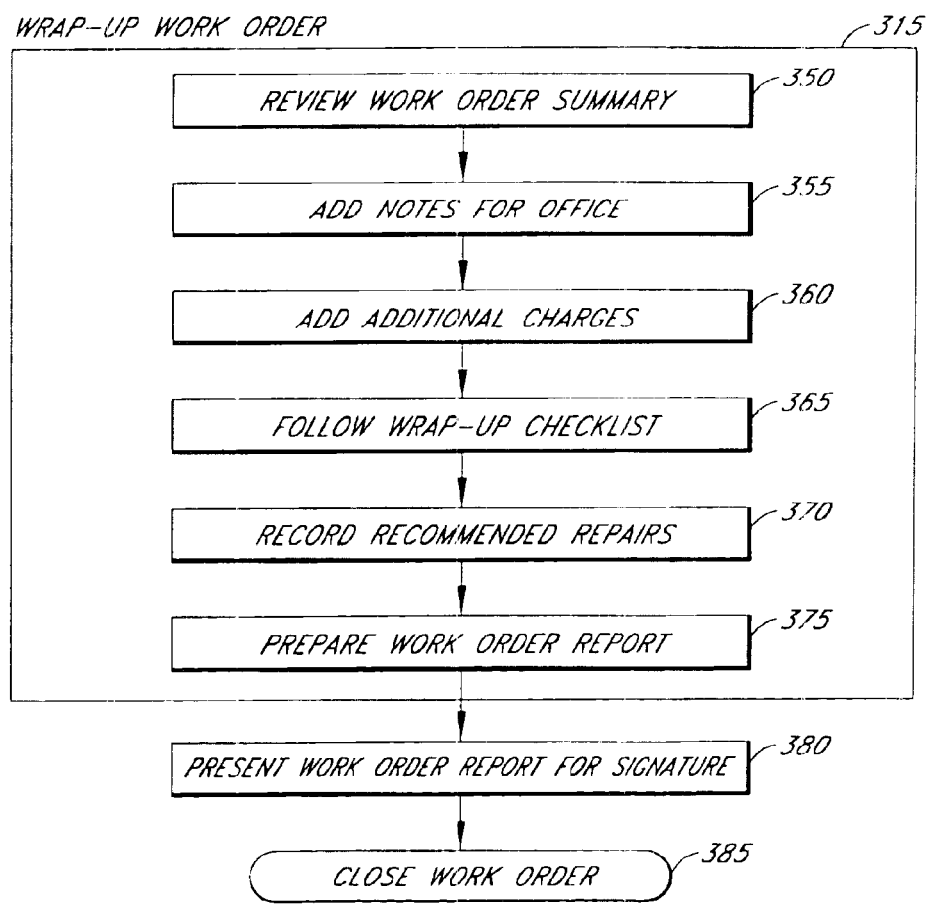
FIG. 2 shows a typical user interface screen for the office system showing the status of a work order in the field service system.

Another important function of one embodiment of the office system 120 is to allow real-time queries to be made to the service center system 110 which give the office information that the FSO needs in order to operate its business successfully. This information includes such data as the current status of a particular technician, the current status of a particular work order (see FIG. 2), or the current status of all technicians (see FIG. 3). Other types of information that may be useful include billing records for clients, and the list of currently requested service that has not yet been dispatched to a particular technician. Work order dispatch functions may be handled by the office system in certain embodiments of the present invention. This will be discussed in greater detail below.

Customer (Client of the Field Service Organization)

The customer is the individual or company who is in need of field service. The customer may have contracted with the FSO prior to the need for service and established terms for such service in advance. In such circumstances, the customer may also provide information regarding the sites to be covered by the service contract and information regarding who to contact when arriving at a job site, and any necessary information about each job site. The customer may have a relationship where they pay a fee for on-call service, or they may simply pay for work performed as it is needed.

In other modes of the present invention, the customer may not have a pre-existing relationship with the FSO, but may be contacting the FSO for the first time when the customer requests service. In these cases, although the process is significantly the same, it may be advantageous for the customer to provide additional information to the FSO at the time of the service request, e.g. where the job site being serviced is, who to contact, who is allowed to sign off on work performed, etc.

The customer system 130 is a computer system used by the customer which allows them to interface with the service center system 110, as will be described below. The customer will interact with the system in order to request field service, give information related to the desired service, and to receive billing information related to the work done.

The customer system 130 is configured to perform these functions by logging onto the service center system 110. The customer system is configured to perform this function by a software application which is run on the customer system that communicates across a communications medium to the service center system. The communications medium 160 is generally some form of wired Internet service, but as discussed above, those of skill in the art will recognize that other communications mechanisms are possible.

In a particular embodiment of the customer system, the customer system comprises a web-based application which runs upon a computer which is connected to an Internet Service Provider (ISP) of the customer's choice. In this embodiment, the service center system is connected to the Internet as well. Information is sent from the customer system to the ISP, who forwards the information to the service center system via the Internet. Information flows back to the customer system from the service center system via the ISP as well.

Parts Repository (Supplier to the Field Service Organization)

The parts repository 150 handles the replacement parts which are needed in the course of field service work. The parts repository may be run by the field service company in one mode of operation of the present invention. In this mode, the parts repository represents the inventory and sup ply function of the field service company itself. In other modes the parts repository may be run by independent parts suppliers who provides parts to the field service company, or even by groups of different parts suppliers who supply the field service company independently. These could represent the manufacturers of the equipment in certain modes of operation. In other modes of operation, the parts repository may comprise one or more organizations under contract with the field service management organization.

In one embodiment, the parts repository is run by a company who enters into a business relationship with the field service management organization to provide parts catalogs and real time pricing and availability information to the service center system. Physical distribution outlets may be located throughout the region in which field service is being performed. This enhances the ability to provide expedited or automatic procurement of replacement parts and equipment for the customer through the operation of the technician system as will be described below. Another means in which the physical distribution of parts from a parts repository may be handled is through the use of a wirelessly networked mobile warehouse. Such a mobile warehouse may comprise a truck or other vehicle which keeps a supply of commonly needed parts available and which delivers them directly to job sites or technicians upon appropriate request.

In such modes of operation, the parts repository 150 is linked to the service center system 110 in order to provide current information on the availability of parts, as well as to allow for immediate ordering and shipment of parts in response to equipment needs discovered on the job site by the technicians. The use of expedited parts procurement will be discussed below.

Service Center System

As shown in FIG. 1, the service center system 110 may be used as a clearing house and data storage and forwarding area for the communications which will take place between the other systems described. Generally, the other equipment is configured to communicate with the service center system exclusively, and the service center system is used to coordinate and control the information which is distributed to the various other systems. Those of skill in the art will recognize that some embodiments need not restrict communications to those to and from the service center system, but rather may allow direct data exchange between a technician and the office, for example.

One purpose for which the service center system is configured is to store information which is received from the other systems. This information can include information which is sent from the mobile technician systems 140, such as the current status of a job which is being performed, or an inquiry as to the availability of certain parts needed for repairs. The service center system 110 may also receive requests for information or updates from the office system 120. This information may include such data as new information related to a new customer or a new technician, as well as information related to the particulars of a particular customer or technician, such as the billing rate of the technician or an updated address for a particular customer. This information is stored in a database 180 or other storage media accessible to the service center system 110.

The service center system 110 need not be run by the field service company itself. For example, in one embodiment, the service center system is located and run by a field service management company independent of the field service company itself Such a company provides or leases the appropriate equipment to a field service company under contract, and that equipment interacts with the service center system in order to carry out the steps needed to manage the field operations of the field service company.

Those of skill in the art will recognize that in some modes of operation, it may be desirable for a field service company to set up and operate its own service center system, rather than contracting this to an independent field service management company. This may be particularly advantageous when the field service company is large or has particular requirements beyond the ordinary customizations available to clients of the field service management company. In situations such as these where operation of a service center system dedicated to the operation of a single field service company is desirable, the service center system may be assembled or purchased and owned by the field service company itself, rather than the field service management company.

In embodiments where the field service company also owns the service center system, there is no need that the office system and service center system be physically distinct. In these situations a single piece of equipment may be used for both functions. However, this is not required and as discussed above, those of skill in the art will recognize that multiple office systems may be used with a single service center system, even for a single field service organization.

In embodiments where the field service management company runs the service center system to coordinate the service operations of the field service company, multiple field service companies may be run by the same field service organization. Each of these field service companies independently contracts with the management company, and each has their own offices, customers, and technicians. Different field service companies operating through the same service center system may even have different parts repositories. The information for each different field service organization is only available to the other components of that FSO's system.

For example, if a particular service center system was managing service for both company ABC and company XYZ, data for both companies would be present within the service center system, and the same types of operations would be performed on data from both companies. However, optionally only data related to the technicians and contracts of company ABC would be available to the office system of company ABC, and job and contract data from the office of XYZ would only be available to the technicians of company XYZ. Although the same service center system would be used for both, each FSO would interact with it independently of the other.

The service center system is in communication with the previously discussed systems, i.e. the office 120, the customers 130 and the parts repository 150, by communications media 160, 170 as discussed briefly above. In a one mode of operation, the communications between these systems is carried out via the Internet. The communications between these systems is carried out using Web-based protocols on the internet, such as HTTP (HyperText Transport Protocol) and HTML (HyperText Markup Language) and using scripting and data exchange formats suited to the Web, such ASP (Active Server Pages) and SSL (Secure Sockets Layer). Those of skill in the art will recognize that other networks and protocols may be substituted for those listed above while carrying out the functions of any of the described embodiments of the present invention and that the choice of such alternate techniques is based upon the circumstances of the use of the system, and not upon the nature of the invention itself.

One advantage of the described embodiments of the present invention is that a field service management company can provide operational control over the work of multiple FSO's simultaneously, and distribute this information directly back and forth to the various FSO's using only an Internet connection for each site. This improves reliability and accessibility of such services to the FSO's as dedicated hardware or communications lines are not required.

Technician (Employee of the Field Service Organization)

The mobile technicians are employees or contractors working for an FSO. They perform the actual work at job sites which require service. Unlike the equipment used for the previously discussed systems, it is highly desirable that the equipment used by the technician as part of the field service management system be portable. Furthermore, it is desirable that the equipment used by the technician be as easy to operate as possible without the use of additional devices, such as a computer mouse, or separate keyboard or any other devices connected by cable or the like which may be cumbersome to use in a mobile environment. The portion of the present system which is used by the technician is referred to herein as the "technician system" 140 or "remote system."

One embodiment of a technician system 140 comprises a small portable computer with an integrated input device, such as an integrated keyboard, pointing device, or touch screen. For example, the technician system may comprise an HPC (handheld personal computer) running Microsoft Windows CE as its operating system. The HPC is configured to operate with the described embodiments of the field service management system with software which provides the desired information flow to and from the unit, as will be discussed below. Of course, other portable computer systems may also be used, including system using other operating systems, such as Windows 98, Windows 2000, Windows NT, Linux or other UNIX variants, the Palm OS, BeOS, Mac OS, or EPOC.

The technician system communicates with the service center system via communications medium 170 as described briefly above. However, as the technician system 140 is generally mobile, it is desirable for the communications between the technician system and the service center system 110 to accommodate this mobility. In one embodiment of the communications media between the technician system and the service center system, wireless communication is established using a non-dial-up wireless connection, such as RAM, Artis, or other "always on" wireless networking protocols. In other modes of operation, the technician system may communicate with the service center system via an ISP using a dial-up connection and a cellular modem, or even by dial-up land line when available (for instance, when at the job site). As discussed above, those of skill in the art will recognize the availability of alternate communications media of similar function to those listed above which would be equally well suited to particular aspects of the present invention.

Furthermore, it is desirable for the communications between the remote system and the service center system to occur automatically without explicit communication related commands from the technician or any other user. For instance, as soon as there is updated status information available to the remote system, this information should be automatically sent to the service center system. Similarly, as soon as the service center system has updated information for the technician system, such as a new work order, it should be loaded onto the technician system without a need for the technician to instruct the system to find new assignments for him. In this way, the automated communications between these systems eliminates the complications, additional steps, and potential failures of communication due to requiring the technician to explicitly instruct his system to contact the service center system.

Advantageously, one embodiment of the remote system is an HPC which includes a wireless communications device which communicates using a non-dialup protocol, such as a wireless alphanumeric pager protocol or a wireless Internet access protocol, so that communications between the technician system and service center system are automatic and transparent to the technician using the system.

Note that throughout the description of the above systems, the systems referred to are logical divisions based upon the functions performed. In some embodiments of the present invention, it may be advantageous for one or more of these systems to be part of the same computer system, or physically located at the same site.

For instance, in circumstances where a FSO purchases their own hardware and software to handle the service center system functions, it is quite likely that at a minimum, the service center system will be physically located at the same site as at least one office system. Furthermore, it may be the case that the service center system and office system comprise the same physical system, which performs both sets of functions.

When multiple instances of a particular system are used, e.g. multiple offices or multiple parts repositories, it may be the case that one of such systems may be combined without one or more of the others. For instance, a system comprising a single service center system, three office systems, and four parts repositories (as well as some number of technicians) may be configured such that one of the offices is combined with one of the parts repositories, and the service center system is combined with both a parts repository and an office.

Those of skill in the art will recognize that these and other combinations of the systems described may be combined at a single location or into a single physical system in alternate embodiments of the present invention.

Operation

One mode of operation of the system described above will now be described to show how management of a field service system is provided. Prior to performing a typical field service call, the management system as a whole is properly configured. This involves loading information regarding each of the existing job contracts and job sites into the service center system from the office, as well as information describing the service technicians themselves, such as their billing rate and employee ID number. This information may be loaded into the service center system initially, and then updated whenever it changes from the office system. In this way, there is no need for the FSO to actually send anyone to the service center system site at any time to update information.

For the discussion which follows, it will be assumed that an FSO has already arranged with a field service management company to have field service management provided through a service center system, and that technician and contract information have already been loaded onto the service center system by the office.

Field service requests are entered into customer systems by the customers as they are needed. For instance, if the boiler is running poorly, the customer may enter an appropriate request into their system. This information is sent to the service center system which acknowledges the need for a service call to this particular customer site, and appropriate information related to this customer and job site is extracted from the database of customer information on the service center system or on the mobile technician system. This information can include without limitation: the address of the customer site; the history of work performed at that customer site; the billing arrangement between that customer and the FSO; the type of repair associated with this sort of problem; the address of the work site (if different from the billing address of the customer); the urgency of the problem; any special preparations that are needed prior to beginning work; or such other information as is known by those of skill in the art.

Once the appropriate information is collected into a complete work order, it is ready to be dispatched to a technician. In one mode of operation, work orders are dispatched to technicians by the service center system directly on behalf of the office. In an alternate mode of operation, dispatching of work orders may be handled by the office. In either case, the operation to take place is similar: the open work order is matched up with a currently available technician to perform that work. Once a technician is chosen for that work order, the information on the work order is sent to the technician system for access by the technician. This information is automatically loaded onto the remote system corresponding to the appropriate technicians and the technician is alerted to the presence of a new work order. This process is discussed in greater detail below.

In modes where the service center system performs the dispatching function, the service center system sends the work order to the appropriate technician system as soon as an appropriate technician is identified. In modes where the office performs the dispatching function, the information for the work order is sent to the office system, where the office may determine to which technician to assign the work order. When the technician is selected, this is communicated back to the service center system who then forwards the work order to the HPC system of the appropriate technician. Although the dispatch selection is handled by different parties, in both modes of operation the work order is sent to the technician using the communications media between the service center system and the technician system. One important benefit of this system is that there is no need for the technician to explicitly call in to the service center system or some other central office in order to receive new assignments; not only are they dispatched electronically, but they are dispatched without a need for the technician to initiate the communication.

Work Flow

The process with which the technician handles the work order will now be discussed with reference to FIGS. 3A to 8B. This process can be termed the work flow of one mode of operation of the present invention. Generally, the work flow involves the process of the technician automatically receiving a work order and all the necessary information to perform the work related to that work order; tracking his status throughout the job; communicating relevant information as it develops between the technician and the service center system; logging the work as completed, including sign-off by the customer; and closing out the work order.

Note that much of what will be described below is specific to a particular type of field service, specifically, field service related to heating, cooling and ventilation equipment, and the examples provided are generally taken from such a field. However, those of skill in the art will recognize that a system as described below in accordance with the present invention can include without limitation: field service systems for electrical repair, industrial machine servicing, elevator repair, business machine repair (e.g. copier repair), interior plant care, computer repair, telecommunications repair and such other fields that use mobile service technicians as are known in the art.

Note furthermore that much of the template of information which is desirably collected from and forwarded to the various parties such as the office and technician will vary with the type of field service system being created. Much of this information can be created or customized by the office so as to reflect the FSO's particular approach to field service.

Furthermore, it is possible that the work flow which is defined using the templates of information sent and the customized user interface upon the remote system can be set up so that each individual part of the system is either mandatory or optional. This may be configured by the FSO in order to more properly control the work being performed by their technicians. For example, if the FSO wants to make sure that certain information is reviewed by the technician before moving on to other parts of the work flow, then that particular item may be made mandatory.

For example, a particular FSO working in the HVAC repair field might find it advantageous to always have the technician perform a measurement of the power available to a ventilation system before proceeding any further with any diagnostic tasks (as will be described below). In order to do this, the system may be configured such that particular readings must be filled in by the technician in the "Readings" portion of the interface before the technician may proceed to the "Diagnostics" portion of the interface. Other mandatory actions might include portions of the "Wrap-Up Checklist", such as the entry of "Recommended Repairs", and the capture of a customer signature before time at a job site can be considered complete.

Other actions which may be recorded within the interface of the system may be optional. These activities, for instance, adding additional notes on a piece of equipment, need not be performed in order to move ahead in the interface of the remote system. By selecting which steps are mandatory and which are optional, the FSO may customize the interface of the remote system so as to most accurately reflect the work flow of their operation and most fully support their business model. The description which follows gives only a single example of a possible work flow and the associated interface for an HVAC servicing business, as indicated with reference to FIG. 3A.

The general sequence of the work flow begins when the work order is received by the technician (300). The status of the technician is automatically updated by the remote system (305), and once on site (310), the technician performs the required work (315).

The technician is led through the steps of the process via the interface of the technician system 140. This guides him through the process of determining which equipment to check (320), taking readings (325), performing diagnostic activity (330), performing maintenance tasks (335) and determining what parts are needed to effect the necessary repairs (340).

Once the work is done, an appropriate "wrap-up" process is presented to the technician for him to perform (345). This includes reviewing the work order summary (350), adding notes for the office (355), documenting any additional charges which must be made to the client (360), following a checklist of necessary wrap-up activities (365), recommending repairs to the customer (370) and preparing the final work order report (375).

Once the work order report is prepared, it is reviewed by the customer and signed (380), which allows the work order to be closed out (385). These steps will be described in greater detail below.

The technician begins each work day by powering up his system, which will automatically communicate this fact with the service center system, thereby designating the technician as available for assignment. In alternate embodiments the technician may be required to explicitly log on initially to designate himself as available or to enter a password or perform some other security or authentication process. However, generally, once the technician system has been activated, the technician is considered to be available for assignment.

Note that once the technician has activated his system, there is no need for him to directly request any form of communication between the remote system and the service center system. All communications will occur automatically whenever a wireless connection is available between the technician system and the service center system. However, in circumstances where a wireless or other "always-on" connection is not available, the remote system may include the capability to explicitly contact the service center system to exchange information across connections such as a dial-up cellular modem or a land-line telephone connection. Although these connections may be made automatically once an appropriate line of communication is available (e.g. once a land-line is connected to the remote system), the connection to such an on-demand only communications medium may require an explicit step by the user.

When the service center system receives notice that a particular technician has become available for assignment, or is available for assignment at the date and time at which it is desired to perform the work, the service center system will update the technician availability information recorded in its database. This information will be available to the office (see FIG. 3) and will be used by the office for dispatching purposes in modes using office dispatching. This information is used by the service center system to choose a technician for this work order in modes using service center system dispatching. In either case, once a technician is assigned to a particular work order, this information is recorded by the service center system, and the work order is sent to the technician system via the communications media.

Figure 4:
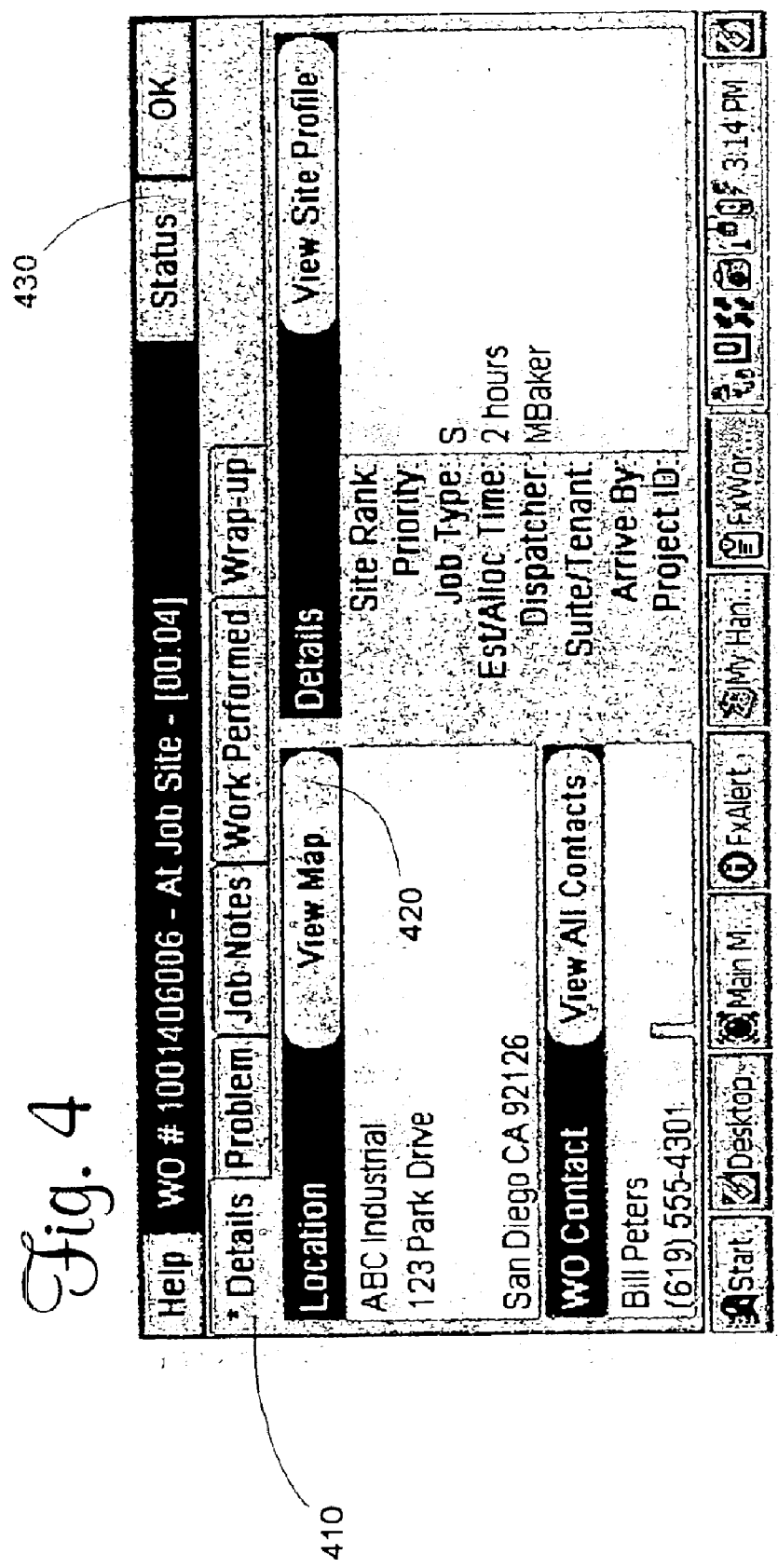
FIG. 4 shows a typical user interface screen for the technician system showing the details of a customer to whom a technician is being dispatched.

The work order will automatically pop up on the technician system screen when it is received, as shown in FIG. 4. This shows a typical work order as the technician will have access to it on his system. This screen shows the basic information related to the work order, which is displayed under the "DETAILS" tab 410 on the technician system, such as the location at which the work needs to be performed, and the person who the technician must contact at the work site prior to beginning work. Additional details may be provided as necessary. The information shown in this and all figures is intended to be exemplary, rather than limiting, and is not intended to restrict the scope of the claimed invention. Alternate configurations for displaying this information to the technician may also be used as will be understood by those of skill in the art.

Note that this includes both visual and textual aspects of the interface presented to the technician. For instance, the names used in labeling various buttons and actions on the screen of the technician system may be altered without altering the fundamental nature of the invention presented herein. Therefore, those of skill in the art will recognize the interchangeability of certain features of the interface discussed below with other similar elements as are known in the art.

In cases where the technician is not currently listed as active for the targeted time for the job to be formed, but is not currently active, a work order may still be assigned to that particular technician for dispatch. In these cases, the technician system will not receive the work order until such time as it is powered up and it connects to the service center system across the communications media.

In addition to the basic information displayed on the technician system shown in FIG. 4, virtual buttons are available which allow the technician to get further information as it is required and appropriate to the task at hand. For instance, in addition to specifying the address of the site at which the work is to be performed, a button labeled "View Map" 420 is provided which will prepare and display a map to the work site upon the screen of the technician system. Of course in addition to or in place of the virtual or "soft" buttons, other techniques may be provided for users to enter data or control the functions of the technician system. For example, drop down menus, "hard" or physical keys, or voice input may be used as well.

This map may optionally be linked to a locator service which allows the system to determine the location of the technician system and thereby display a more useful map. For instance, if the technician system is located 30 miles from the job site, a map which is zoomed out to a large scale may be the most appropriate display for leading the technician to the job site. Conversely, when the technician system is located within a mile of the job site, a map of smaller scale showing individual streets may be displayed to guide the technician directly to the proper address.

Such location services may be provided by Global Positioning System (GPS) units either embedded or attached to the technician system, area navigation systems such as LORAN which may be mounted on vehicles, tracing features which may be available through wireless communication networks, or such other means as are known to those of skill in the art.

Additional buttons or other user input may be provided as shown to allow the technician to find alternate contacts at the job site if the primary contact is unavailable, as well as information related to the job site itself. This may include information which has been entered by the customer himself during the request for service (e.g. don't park on the street), or by the office when they set up the contract (e.g. always show your employee ID to the guard when you sign in). Information recorded by previous technicians working at that job site may also be included when appropriate (e.g. be careful of beehives near roof access). All of this information is available to the technician immediately upon receipt of his work order, allowing the technician to waste no time in proceeding to the job site aware of what needs to be done.

In addition, information regarding customer information and equipment catalogs and lists of data (such as Readings, Diagnostics and Tasks as will be discussed below) are optionally stored in the technician system at all times, eliminating the need to download this information from the service center system with each individual work order. This information is periodically updated by the service center system, but in general, is available at all times on the technician system for more rapid response and reduced bandwidth consumption of the communications media. This can be particularly important when the communications media is of low bandwidth, such as the alpha-numeric pager network or when the network connection is interrupted.

In general, the interface of the technician system is laid out such that important information is generally accessible by simply touching the item on the currently visible screen about which more details are desired. For instance, as discussed above, the buttons available on the interface screen shown in FIG. 4 are arranged such that more details on the location, contacts or job site information are available by using the "View Map" 410, "View All Contacts" and "View Site Profile" buttons.

Furthermore, in one embodiment of the present invention, the interface is designed so that the buttons which are most often used in the course of progressing through the interface of the technician system are positioned for easy access by the thumbs of the technician while using the system. To accomplish this, the available buttons are generally laid out along the left and right vertical edges of the touch-sensitive display. In this way, the technician may hold the remote system in his hands and navigate the interface with his thumbs, without having to let go of the device with either hand. This may be particularly advantageous when the technician is working in an environment in which it is not convenient to put down the remote system in order to operate it.

In an additional mode of the present invention, the interface of the technician system may be designed to provide at least two general navigation buttons, one on each side of the touch sensitive display. As above, these buttons are desirably positioned such that one is accessible by the left thumb of the technician while holding the device, and the other is accessible by the right thumb of the technician. One button is generally programmed to advance the cursor or selection on the current screen when used, and the other is programmed to bring the cursor back to a previous selection or position. In this way, the available choices on the screen may be navigated by the technician using his thumbs without requiring all choices to be located at the lateral extremes of the screen.

A "STATUS" button 430 is also located at the upper right of the screen as shown in FIG. 4. This button is available in all screens of the technician system and allows the technician to enter his current status by checking off the appropriate box on a pop-up form. When clicked or touched, the "STATUS" button causes a box to pop up which lists the available states for the technician: available, in route, at job site, off duty, getting signature, and such other states as may be useful to the office. This list of available states may be customized to suit particular FSO's and the types of work they perform.

Generally, the technician system will be able to determine the technician's status by tracking the operations which are being performed with the technician system. For instance, if the technician system is off, the technician status will generally be considered to be "off-duty." If the system is being used to review an upcoming job and the technician is not currently on another job, the technician is "in route" to the next job site. If the technician is entering the details of the work he is performing, the technician is "at job site." As often as possible, the system will update the status of the technician based upon the actions being performed using the system.

However, not all circumstances allow the technician's state to be conveniently determined by the system. In these case, it is desirable to allow the technician to enter his current status manually. By touching or otherwise actuating the "STATUS" button, the technician may view his current status and update it. When he changes the status and exits the status pop up window, the new status and the time at which the status was adjusted will be forwarded to the service center system. In this way, this information can be used to update the information available to the office, as well as to update the information needed to properly perform dispatching of new jobs.

Basic status information is available at all times in the title bar of at the top of the display on all screens of the technician system. The information shown includes the current work order number or other identifier, as well as the current state of the technician, and the time since the job began. The status shown in FIG. 4 shows Work Order # 1001406006, the technician's status as "At Job Site" and the time since the job began as 4 minutes (00:04).

Figure 5:
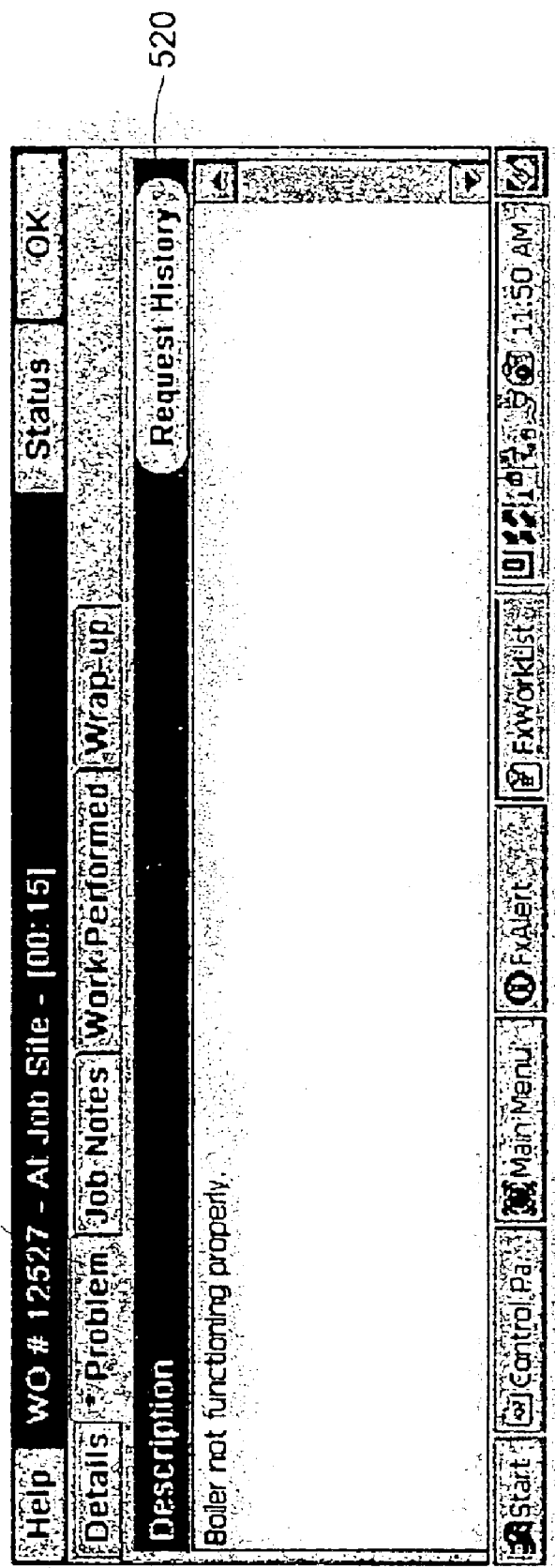
FIG. 5 shows a typical user interface screen for the technician system showing the description of the customer's need for a service call.

As shown in FIG. 5, the tab next to the "DETAILS" tab is the "PROBLEM" tab 510. When this tab is touched, it brings up a window which shows the description of the problem reported by the customer. This description is entered automatically into the work order based upon the original report of the problem from the customer. This screen also includes a "REQUEST HISTORY" button 520 which will produce a listing of previous work problems reported and work performed at this job site. This information can be extremely useful in diagnosing a current problem.

Figure 6:
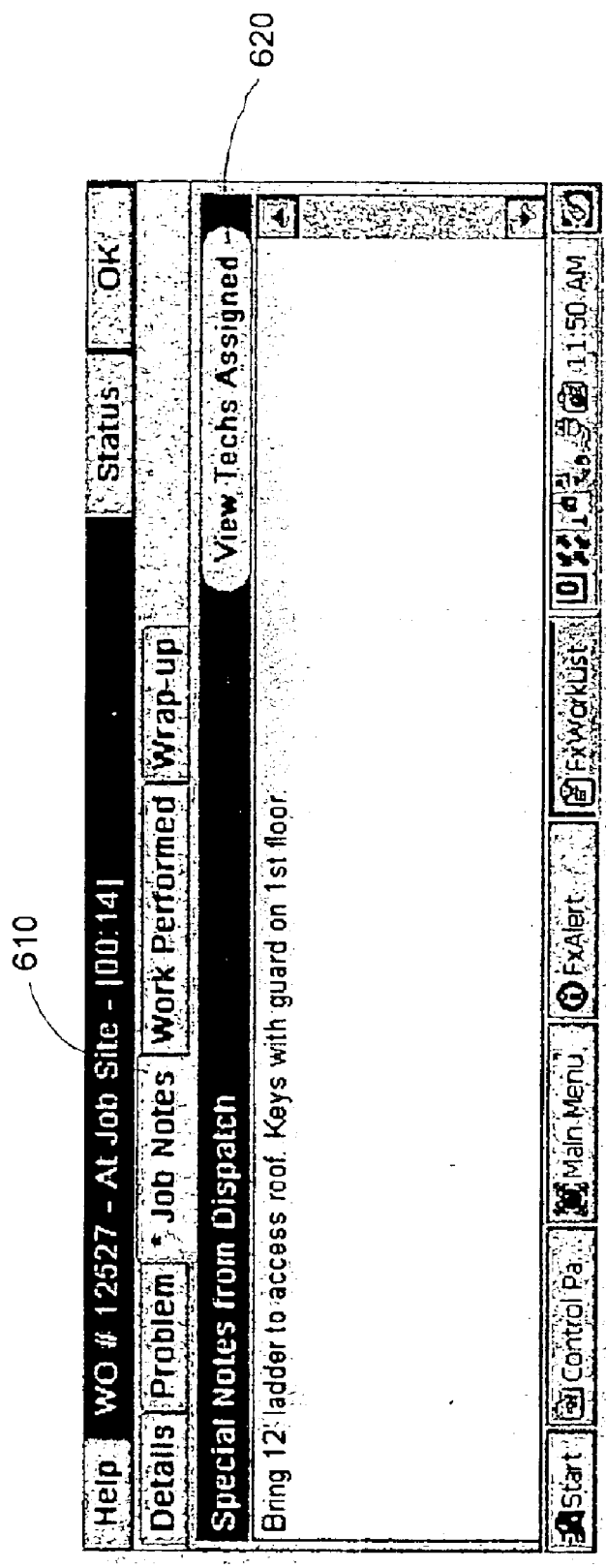
FIG. 6 shows a typical user interface screen for the technician system showing details regarding the job provided to the technician from the dispatcher.

In addition to the information presented on the "PROBLEM" screen, the technician system also has further information available if the technician chooses the "JOB NOTES" tab 610. A typical screen that would be seen under this tab is shown in FIG. 6. This screen shows notes which have been included for the technician by the dispatcher beyond the information that was submitted by the customer in reporting the problem. This information is generally extracted from the database of information associated with the particular customer on the service center system.

For instance, if the customer is located in a windy area which makes working on rooftop ventilation equipment difficult, information could be entered into the profile for the customer which reminds the technician to bring safety lines if work is to be performed on the rooftop equipment. Similarly, if there are special procedures which must be followed to access the building or get in touch with the contact person, such information could also be included here, as shown in the "Special Notes from Dispatch" box on the "JOB NOTES" screen in FIG. 6.

This screen can also be used to present information which is associated with the particular type of equipment being serviced. For example, if the original problem report from the customer stated that their Brand X Model 17 fan system was broken, information regarding precautions necessary to take when servicing a Brand X Model 17 could be included when the work order is prepared for the technician. This can be desirable when the equipment to be serviced requires special tools or equipment to service which are not normally used on a service call.

The "JOB NOTES" tab 610 also includes a button to get further information regarding the other technicians who may have been assigned to this particular work order by the dispatcher. By pressing the "View Techs Assigned" button 620, a listing of all of the technicians assigned to this work order will be shown. Such a listing can be useful so that a given technician may coordinate his activities, such as travel, with other technicians so that they each use their time on the job site most effectively.

Figure 7:
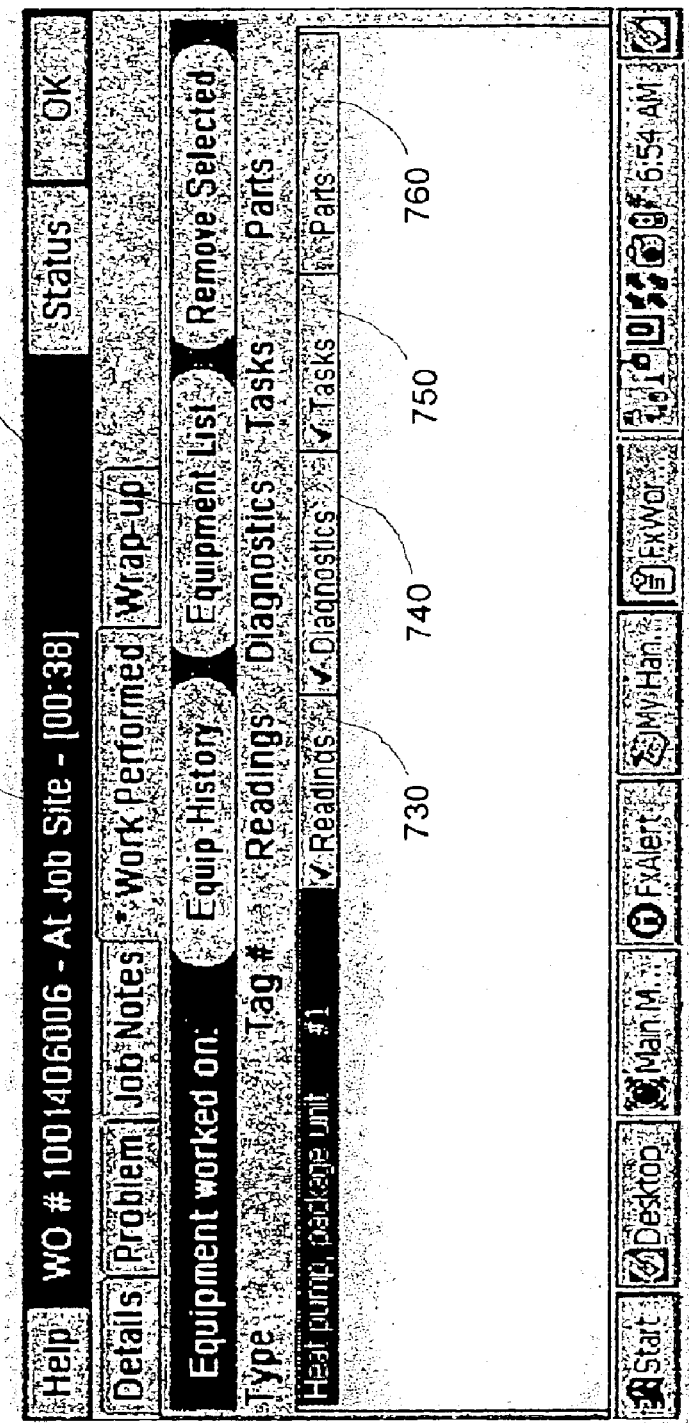
FIG. 7 shows a typical user interface screen for the technician system allowing the technician to track the actual work performed while on the job site.

FIG. 7 shows a typical screen of information that may be seen under the "WORK PERFORMED" tab 710 of the technician system. This screen is used to guide the work performed by the technician while on site, as well as to document and memorialize the actions taken by the technician in diagnosing and repairing the reported problem. This screen also includes access to important deeper layers of information and processes that are beneficial to the technician in diagnosing and correcting problems on site.

The general structure of this screen is a list of the equipment on which the technician performs an inspection or any other work. Initially, when this screen is presented, it will be blank, i.e. it will not yet have any equipment listed on it. When the technician begins to work on a particular piece of equipment, he first clicks on the "Equipment List" button 720 located in the row above the (currently blank) list of "Equipment Worked On." When this button is selected, a list of all of the equipment known to be included within the contract between the FSO and the customer will be shown, and the technician can choose from that list the particular piece of equipment on which he is working.

This list of equipment on site and under contract is available because when the initial contract was set up, the customer will have made arrangements with the FSO to provide a list of the equipment for which service is being contracted. In other modes of operation of the present invention, the detailed list of equipment on the customer site can be produced by a technician who performs an inspection of the customer site and then sends back the list of equipment for inclusion within the customer profile within the database of the service center system.

Once the appropriate piece of equipment is selected, the technician system returns to the screen shown in FIG. 7, including the selected piece of equipment within the list of "Equipment Worked On." A group of further choices now appears to the right of the listed piece of equipment. These choices, labeled "Readings" 730, "Diagnostics" 740, "Tasks" 750 and "Parts" 760, represent the fundamental steps that are undertaken by the technician when working with any piece of equipment. First, the equipment is examined and basic information regarding its operation is noted (Readings); then specific items are verified off of a checklist in order to determine where the fault lies (Diagnostics); then typical maintenance actions are performed which are known to be effective on that equipment (Tasks); finally, a replacement part is selected and ordered if it is needed (Parts).

A typical screen which is shown in response to the "Readings" button is shown in FIG. 7A. As can be seen at the upper left region of this screen, there are several tabs with different headings, such as "Cond Unit," "Elec," "General," and "Notes." Each of these tabs brings up a list of readings which are related to the particular piece of equipment selected and also to the particular category listed. These lists are fully customizable and are all taken from a catalog of appropriate readings for each different piece of equipment on the job site, and which is stored on the service center system and forwarded to the technician system as needed.

In one mode of operation, some or all information related to equipment on the job site is forwarded to the technician along with the work order. In this way, if communication between the technician system and the service center system is interrupted due to the technician system being out of range of the communications media or interference due to the environment in which the technician is working, the information needed by the technician is already loaded onto the technician system and available for use.

Space is provided in each of the "Readings" screens for the technician to enter the measured values of the readings taken. In addition to this space providing a preformatted place for the technician to provide readings 735, 737 as they are taken, the list of readings provides a guide to the technician of what he must do. For example, if the technician has not found the problem or a lead to the problem in the first few readings he takes, the list found on each tab can lead him to take all of the normally available readings in order to more fully document the behavior of the troubled equipment.

This screen also includes a "Notes" tab, which brings up a window which includes a space for the technician to record any other information related to the readings taken which does not belong in the space provided, i.e. any information other than the actual values of the readings taken, such as "funny sound while taking high side pressure measurement" or "crankcase discolored near back connection." A "Notes" tab is found on several other screens within the technician system to allow the technician to make notes wherever they are appropriate in the process of performing work on site (see FIG. 7B).

When the technician has completed taking any necessary readings, he can proceed back to the screen shown in FIG. 7. As each of these pop up lists is completed, that item is now shown with a check mark next to it, as shown in FIG. 7 for Readings, Diagnostics, and Tasks. The technician may now click on "Diagnostics." This will cause the technician system to produce a window similar to that shown in FIG. 7B, the "Diagnostics" window.

The Diagnostic window is set up in substantially the same manner as the Readings window, except that the tabs listed each show different aspects of the equipment which may cause failures and which the technician should check. These lists and categories of items to check are also taken from the appropriate equipment catalog in the service center system.

Since there are no values to enter in the Diagnostics screen, each item has a checkbox 745 which can be checked off once the particular diagnostic action is taken. As shown in FIG. 7B, the equipment has been checked, and it has been discovered that the problem is that the belt is not properly in position.

When the appropriate diagnostic actions are taken, the technician can return to the previous level by hitting the "OK" button 748 in the upper right of the screen. At this point, the "Diagnostics" block will also become checked off on the "Equipment Worked On" screen (see FIG. 7).

The technician will then click on the "Tasks" button 750, which will produce another window of the same type as that shown in FIGS. 7A and 7B which will display a tabbed list of maintenance tasks for the technician to perform before completing work upon this unit. The information for these lists is also taken from the service center system database as described with relation to the "Readings" and "Diagnostics" screens. This screen may also include a "Notes" tab in one mode of operation to allow the technician to record additional actions taken or note unusual results while performing the desired actions.

The final block to the right of the line detailing this piece of equipment is the "Parts" button 760. This button takes the technician to a screen which allows the selection and ordering of a replacement part to be used with this piece of equipment (if necessary). When this button is pressed, the system interfaces with the appropriate parts repositories and its interface, as will be discussed below. Note that if there are no new parts to order, then there will be no need for the technician to press this button.

Also provided in one mode of operation of the technician system is a "Equipment History" button, which allows for the history of any particular piece of equipment on the job site to be recalled for review. In this way, it will be possible to determine, for example than the particular unit being examined has been replaced three times in the past two years, or perhaps that on all previous work orders, this unit has needed a particular adjustment.

Figure 8:
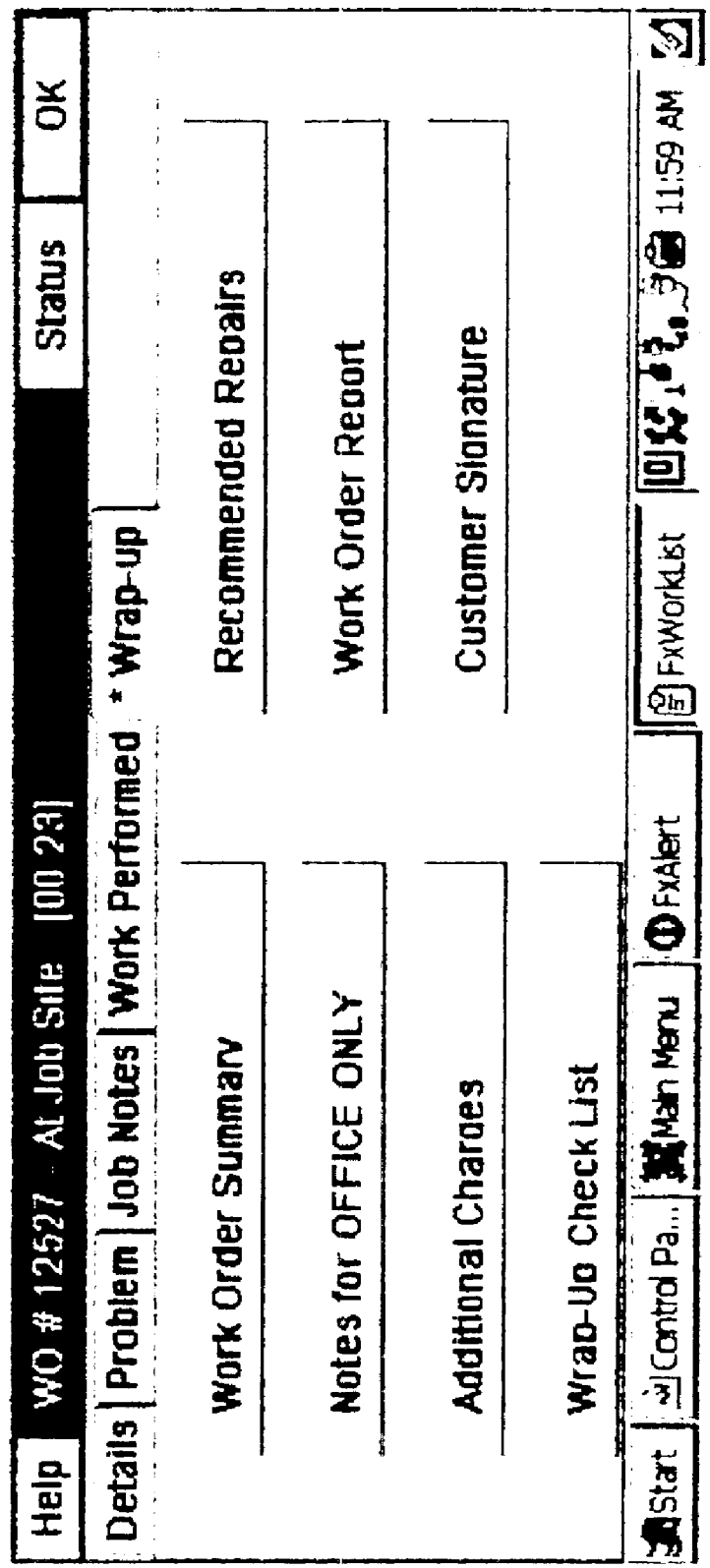
FIG. 8 shows a typical user interface screen for the technician system showing various tasks for the technician to perform prior to leaving the job site.

This process described above is repeated as necessary for each piece of equipment which is examined or worked on by the technician. When the technician has no more equipment which needs work, he can continue on by selecting on the "WRAP UP" tab. This will lead to a screen such as is shown in FIG. 8.

This screen provides a number of buttons which provide access to functions which are used in completing the information necessary for the technician to perform before preparing the finished work order report and getting a signature from the customer. As shown these include the Work Order Summary, Notes for Office Only, Additional Charges, Wrap-Up Checklist, Recommended Repairs, Work Order Report, and Customer Signature. These functions will each be discussed briefly below.

The Work Order Summary is a listing which is generated based upon all of the recorded information produced and recorded upon the technician system at the job site. This produces a line-by-line summary which includes such information as the time of arrival of the technician to the job site, the name of each piece of equipment inspected, the specific measurements made and the values of the readings taken for that equipment, the diagnostic activity performed, the maintenance tasks performed, and the replacement parts ordered, if any. This information is listed for each piece of equipment which was worked on. Additionally, any notes entered by the technician in the "Notes" screens will be entered here as well.

The end result is a complete listing of the detailed activities of the technician. This is beneficial as it not only provides an audit trail, but it also makes it clear to the customer what work was done by the technician and what was discovered. This level of detail provides a more satisfying record for the customer and helps the FSO maintain its clients. Any changes to the summary that need to be made may be made on this screen in one mode of operation of the technician system.

The Notes for Office Only function is used to add notes to the work order summary that will only appear on the copy of the work order that is sent to the office and service center system, but not on the copy that the customer receives. This function is useful for appending information that is either unrelated to the customer specifically (for example, if the technician was late to the job site because of construction on the highway) or information which does not belong upon the customer copy of the work order report (for instance, a note that from now on the technician should try to speak with one particular contact person and not another).

The Additional Charges function is used if additional fees must be added to the amount billed to the client for this work order. Since charges based on the technician's time spent on the job site and charges for the parts ordered are all included within the automatically tabulated fees, the Additional Charges area may be used for other costs which are to be charged to the customer. For instance, if the customer is located in a distant region and a surcharge is added for such travel, this could be entered using the Additional Charges function.

The Wrap-Up checklist provides a screen with a list of action items to be performed by the technician before considering the job complete. This is a list which can be loaded and customized based upon the customer, the technician, or generally for the entire business of that particular FSO. This could include such actions as making sure to speak to a particular person before leaving the job site, remembering to check to see that all tools are recovered at the end of any work performed, discussing the work order report with the customer's maintenance staff, and so on.

The Recommended Repairs function provides a list to the technician of maintenance oriented repairs that the technician can suggest to the customer. This information can also be customized based upon the particular customer or the particular parts which were known to be worked on during the job.

The Work Order Report button is used when the technician has completed the previous five functions, and is ready to prepare a copy of the work order to present to the customer. The information discussed above when discussing the Work Order Summary is included in the work order report, along with billing information, customer information and technician information. This information is presented on screen, and in one mode of the present invention can also be printed if a hard copy is needed.

Once the client is presented with a copy of the work order report, the client can sign the screen of the technician system, which will capture the signature and use this as an acknowledgment of the work order. The details of this system will be described below with reference to FIG. 8B.

Once the work order is signed off on and complete, the status of the technician is automatically reset to available, and the next work order to be performed (if there is one currently queued for this technician) will pop up.

At the end of a work period, such a work week or bi-weekly pay period, the technician system will present the technician with a time sheet which represents the hours worked by the technician during that work period. An example of such a time sheet is shown in FIG. 8A. This time sheet includes basic information about the time worked such as the work order 850 with which the time is associated and the job site 855 at which the work was performed. The time sheet also includes the length of time 860 worked at each such site on each such date and the pay rate associated with that time. Different pay rates may be associated with straight time and overtime as is traditional in wage-based pay systems.

This information is sent to the technician system from the service center system database. When the information is presented to the technician, he may review it for accuracy. Once reviewed, the technician can either acknowledge the time record as accurately representing the work that he has performed during that period, or he can contest it if necessary. If the technician chooses not to acknowledge the record, he simply his cancel to exit the time sheet review screen. This will signal the service center system that further inquiry must be made into this technician's time sheet.

Figure 8B:
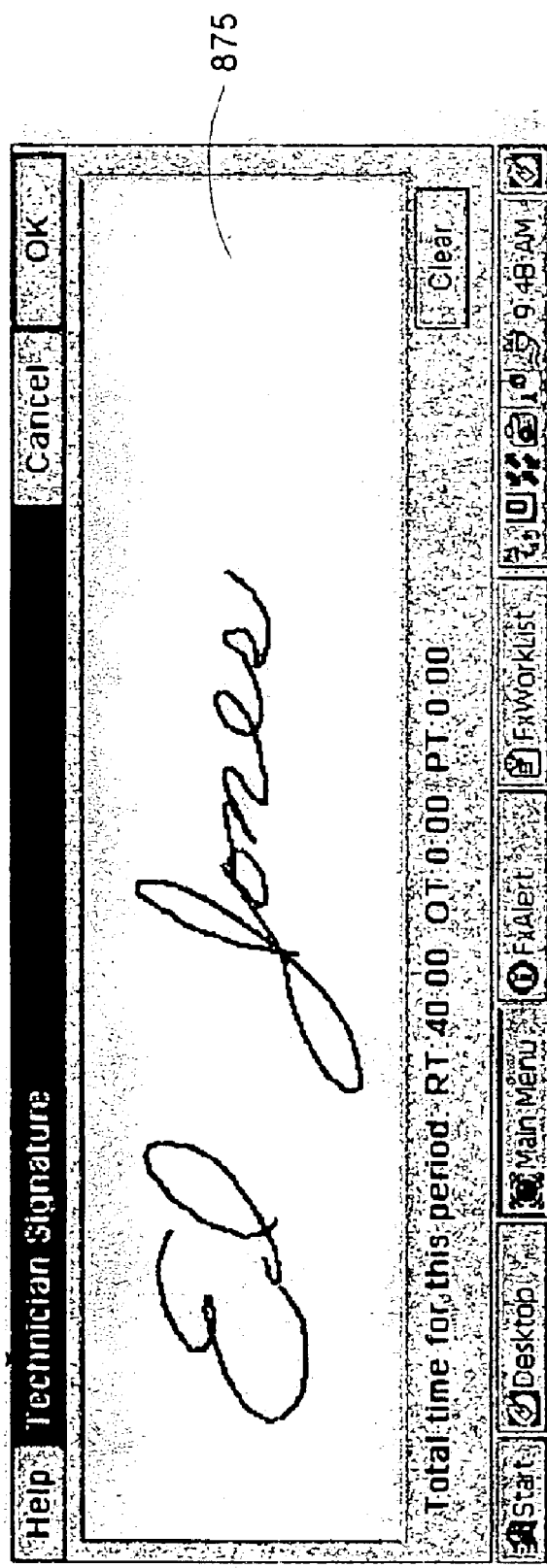
FIG. 8B shows a typical user interface screen for the technician system allowing the technician to sign his time sheet via the mobile system.

If the technician agrees with the time sheet as presented, he can press the "Signature" button, which will bring up a screen as shown in FIG. 8B. When this screen is presented, the technician can sign his name directly on the screen 875 of the device, where it will be captured and sent to the service center system as acknowledgement of the accuracy of the time sheet presented.

By using this system of "signing" the time sheet entries on the remote system, the technician is freed from the necessity to travel to a central office or some other physical location in order to turn in and sign his time sheet for the pay period. Combined with the other remote functions described above, the technician can now operate for significant periods of time without the need to return to a central office of any kind. This may provide a significant advantage for FSO's which operate over a large geographic area, or which have small branch operations located at some distance from the central facility.

A similar system to the signature screen presented in FIG. 8B is used for customer sign-offs on jobs in another mode of operation of the current invention. After the customer has reviewed the work order summary and cost presented by the technician, the technician may press the signature button, and a customer signature screen similar to that shown in FIG. 8B will be produced. However, in one embodiment of the present invention, the display of the signature screen will be rotated 180 degrees such that the customer can sign the screen while the technician holds the system for him. Alternatively, the appearance of the signature screen can be adjusted by the technician to use either a normal or a rotated orientation as is appropriate.

Expedited Parts Procurement

In modes of operation which provide expedited parts procurement, a parts repository system is connected to the service center system via a communications medium, as shown in FIG. 1. While not all modes of operation of the present invention need to include a parts repository, the inclusion of such a system enhances the operation of the field service management system. Expedited parts procurement through the parts repository 150 allows the technician to specify the equipment needed to effect the repair to the job site, determine its current price and availability, and place an order for the parts in real time while working on the job. This eliminates delay, and in some cases, may even allow the technician to pick up the part immediately and perform the repair work without a separate return visit at a later date.

As discussed above, the parts repository 150 may represent an independent parts vendor, a warehouse associated with the FSO, a warehouse associated with the field service management company, or may even represent more than one of these. Furthermore, the parts repositories may be mobile in certain modes of the present invention, allowing for rapid, real-time delivery of parts to technicians on the job site.

Information is sent to the parts repository in response to activity by the technician on the "Parts" screen which is accessed from the "Equipment Worked On" screen of the "WORK PERFORMED" tab in the technician system. When the technician enters the "Tarts" screen, a list of parts used in repairing or replacing components of the currently selected piece of equipment is presented. This list is generally resident on the technician system at all times, although it can be updated or re-downloaded as needed (e.g. if the information is updated when parts become obsolete or are replaced with newer models).

The technician selects the type and quantity of parts that he will need to get in order to complete the repairs on the current equipment, and this information is sent to the service center system for relay to the parts repository. In one aspect of this communication, the message may be sent using email or other one-way communications services as are known in the art to send a single message from the technician system to the parts repository. This message may specify the model number of the parts needed as well as the quantity. Once this message is sent, the technician may continue his work until a return message is received via email giving the price and availability of the parts requested.

In other aspects of the communication between the technician system and the parts repository, an application is running on the parts repository system which is configured to automatically respond to requests for pricing and availability information requests from technicians using the service center system. This sort of communication is sent to the service center system and then relayed from the service center system to the parts repository system via the Internet or other communications media When this information is returned to the technician system, he can immediately choose to order the parts, either for pickup if there is a distribution outlet with the parts available in the nearby area, or for delivery to the job site. In cases where the parts repository is itself a mobile warehouse as described above, the parts may be delivered directly to the job site immediately upon their order by the technician. In cases where the parts may not be available rapidly, the technician can then schedule a time to return to the job site and complete the repair.

In further aspects of expedited parts procurement, the parts repository system is tied into the inventory control system of the parts vendor and this allows for more fully automatic transactions between the technician and the parts vendor through the service center system and the parts procurement system.

Mobile Communications

Because the communications between the service center system and the technician system involves a connection to a mobile system, it is desirable that there are multiple means available for the technician system to exchange data with the service center system. One aspect of the present invention makes use of dial-up land line telephone connections between the technician system and the service center system. These connections are made whenever the technician is at a location where it is convenient and appropriate for the technician system to be physically connected to a land line phone.

Although these connections are reliable and nearly universally available, a connection using a land line phone requires that the technician system is not moving far from the landline port during this connection. As a result, this sort of connection is not desirable for all circumstances in which the technician system is operated. For these circumstances, it is advantageous for there to be a wireless connection of some kind between the mobile technician system and the service center system.

Such wireless connections can include systems such as cellular modems, both analog and digital, wireless alphanumeric pager based communications, and wireless Internet access. In one mode of operation, wireless Internet access is made available for the technician system using a wireless Internet transport protocols known in the art, such as Ardis, Mobitex or WinSock based communications networks. In a particularly advantageous mode of operation, multiple wireless transport protocols are supported by the technician system, as well as allowing for manually initiated dial-up connections. In this way, the technician system is able to be in communication with the service center system as much as possible in as seamless a way as possible.

In addition to providing for wireless data exchange between the technician system and the service center system, it is beneficial for the communications media in use between the service center system and the technician system to be able to automatically reconnect after an unanticipated disconnection, and to automatically recover messages which may-have been in transit during the disconnection.

These recovery and reconnect functions are configured to occur without need for intervention by the technician. As soon as a communications link is available, communications are made between the remote system and service center system as necessary. If the link is broken, communications are queued (as discussed below) and then restarted upon reestablishment of a communications link. An example of one system in accordance with the present invention is shown in FIG. 9 and discussed below.

The architecture shown in FIG. 9 shows one possible mode of connecting a service center system 110 and a remote technician system 140. Each system comprises the system itself, a message queue 940, 960, and a message agent 950, 980. The illustrated and described architecture uses the Internet as a communications backbone, but those of skill in the art will recognize that wireless communications embodiments in accordance with the present invention need not include the Internet.

In order to send a message from the service center system 110 to the technician system 140, the message, once created, is passed on to the message queue 940 of the service center system. Messages are stored in the queue with a status associated with the message until such time as the message is known to have been properly received by the technician system.

The host message agent (HMA) 950 periodically reads the messages in the queue and examines their status. Messages which have not yet been sent are taken by the HMA and forwarded to the Internet Service Provider (ISP) 910 being used by the service center system. The status of the message in the queue is updated to reflect when it has been sent. Once the message is passed to the ISP, the ISP forwards the message to the appropriate Internet 900 systems as determined by the destination Internet address of the message. This routing function is a standard function performed by Internet systems as understood by those of skill in the art.

In the shown embodiment, the destination address will correspond to wireless communications system which is capable of communicating with the technician system 140. Generally this will be accomplished through the use of an ISP that provides wireless connections. Such a Wireless Internet Service Provider (WISP) 920 is shown in FIG. 9. The WISP sends the message to various transmission means in order to attempt to pass the message on to the technician system. In the illustrated architecture, the transmission system utilizes radio frequency transmitters corresponding to radio frequency cells as used by a cellular communication network. The WISP 920 may pass the message to multiple cells 930 in order to more effectively deliver the message to the technician system 140.

When the technician system 140 is within the coverage zone of one of the RF cells 930 and powered on, the wireless modem 980 or other wireless communications device within the technician system will receive the signal containing the message from the service center system 110. This message is passed to a remote message agent (RMA) 970 which executes on the technician system. The RMA passes the message to a queue 960 on the technician system which stores the message, along with its current status (received). The RMA then sends an acknowledgement back along the same path in reverse to the HMA indicating receipt of the message. The technician system reads messages from the queue 960 as they are received.

When the HMA 950 receives the acknowledgement, it updates the status of the message in the queue to indicate it was received. By periodically re-sending messages that have been sent but not acknowledged, this system allows both the technician system and the service center system to recover from any circumstance where a message or acknowledgement is lost during transmission or if one of the machines fails during transmission. This also accounts for any potential loss of communications which may occur when the technician system is not within range of any of the RF cells 930 or other wireless communications devices.

The same process is used in reverse when sending a message from the technician system 140 to the service center system 110. By periodically storing the messages from the queue and their status, the disclosed architecture can recreate any messages which were not acknowledged and recreate any transmissions which were made.

In circumstances where an automatic connection cannot be reestablished (e.g. due to interference with wireless networks or because the remote system is out of range of the available network coverage), the technician may choose to explicitly set up a connection over a land line or a dial-up cellular connection in order to exchange data with the server. However, if there is no urgent need for updated information, the technician may optionally wait until the next time an automatic communication can be established, at which time, the remote system and service center system will exchange any data necessary.

In order to accomplish this, the technician system and the service center system are configured to maintain a journal of messages that have been sent and received to the other. A separate journal representing the last known state of each message (send began, send completed, send completed out of order, and so forth). Based on this information, the systems will be able to know which messages were not successfully passed to the other system if communications are lost by searching their journals. When connections are re-established, messages which were in progress can be resent and then processed in the correct order.

These journals and the logic to properly handle the transmission and receipt of these wireless messages are handled by the HMA and RMA. In one operating mode of the present invention, the RMA and HMA are configured such that the RMA and HMA automatically initiate communications whenever the technician system is within the range of a valid wireless communications network.

The various embodiments of the field service systems described above in accordance with the present invention thus provide a method to manage a number of remotely operating field service technicians from a central site effectively. The technicians need not report into a central physical location manually, nor need they make a large number of phone calls to conduct routine business with the office. Furthermore, much of the necessary tracking of information is performed automatically.

Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the technician system and service center system as described above may be used with an office system which is more limited than that described herein and without the use of a parts depository at all. In addition to the variations described herein, other known equivalents for each feature can be mixed and matched by one of ordinary skill in this art to construct anchoring systems and retainers in accordance with principles of the present invention.

Although this invention has been disclosed in the context of certain preferred embodiments and examples, it therefore will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow. In the claims below, reference characters used to denote process steps are provided for convenience of description only, and not to imply a particular order for performing the steps.

What is claimed is:

1. A method for sending a message from a service center system to a remote, portable wireless system over an intermittently available communications network, comprising:

providing a first message queue for the service center system to store the status of the message;

providing a second message queue for the remote, portable wireless system;

connecting a host message agent to the first message queue;

connecting a remote message agent to the second message queue;

passing the message from the first message queue to the host message agent;

setting the status of the message in the first message queue;

determining that communication over the intermittently available communications network between the service center system and the remote, portable wireless system has been interrupted;

holding the message and the message status in the first message queue during the interruption;

automatically reconnecting the remote, portable wireless system to the intermittently available communications network;

determining that the communication over the intermittently available communications network between the service center system and the remote, portable wireless system has been reestablished, and automatically transmitting the message from the host message agent over the intermittently available communications network to the remote message agent;

passing the message from the remote message agent to the second message queue; and updating the status of the message in the first message queue;

wherein at least a portion of the intermittently available communications network comprises a wireless communications network and the message is transmitted at least in part over the wireless communications network.

2. A system for sending a message from a service center system to a remote, wireless system, comprising:

a first message queue in communication with the service center system;

a host message agent in communication with the first message queue;

a remote message agent in communication with the host message agent via an intermittently available wireless communications network; and a second message queue in communication with the remote message agent and with the remote, wireless system;

wherein the first message queue is configured to store the message and the status of the message, and to receive updates to the status of the message from the host message agent, and the service center system determines when communication with the remote, wireless system, over the intermittently available wireless communications network, has been interrupted, and the host message agent is configured to send the message to the remote message agent over the intermittently available wireless communications network upon determining that communication with the remote, wireless system has been reestablished, the remote message agent configured to send an acknowledgement of the message to the host message agent upon receipt of the message, and the remote message agent configured to pass the message to the second message queue for access by the remote system.

3. The method as in claim 1 wherein at least a portion of the intermittently available communications network comprises the Internet and the message is transmitted at least in part over the Internet; and wherein the remote, portable wireless system communicates with the intermittently available communications network directly via the wireless communications network; and wherein the wireless communications network comprises a cellular radio frequency network.

4. The method as in claim 1 wherein at least a portion of the intermittently available communications network comprises the Internet and the message is transmitted at least in part over the Internet; and wherein the remote, portable wireless system communicates with the intermittently available communications network directly via the wireless communications network.

5. The method as in claim 1 wherein the service center selects a first protocol from a plurality of available protocols for transmitting the message.

6. The method as in claim 1 wherein at least a portion of the intermittently available communications network comprises the Internet and the message is transmitted at least in part over the Internet.

7. The method as in claim 1 wherein the wireless communications network comprises a cellular radio frequency network.

8. The method as in claim 1 wherein the message is transmitted at least in part over at least on of a land line telephone connection, an analog cellular telephone connection, a digital cellular telephone connection, a pager network, and a television cable network.

9. The method as in claim 1 wherein the message is transmitted at least in part using radio frequency communication.

10. The system as in claim 2 wherein the host message agent is configured to repeatedly transmit the message to the remote, portable system until an acknowledgement is received.

11. The system as in claim 2 wherein the message is transmitted at least in part over the Internet.

12. The system as in claim 2 wherein the message is transmitted at least in part over the Internet; and wherein the intermittently available wireless communications network comprises a cellular radio frequency network.

13. The system as in claim 2 wherein the intermittently available wireless communications network comprises a cellular radio frequency network.

* * * * *